INVENTOR.
KENNETH T. WHITBY
BY
Braddock + Burd
ATTORNEYS

Nov. 26, 1968 K. T. WHITBY 3,413,545
APPARATUS AND METHOD FOR DETERMINING AEROSOL PARTICLE
CONCENTRATION AND PARTICLE SIZE DISTRIBUTION
Filed June 23, 1965 4 Sheets-Sheet 2
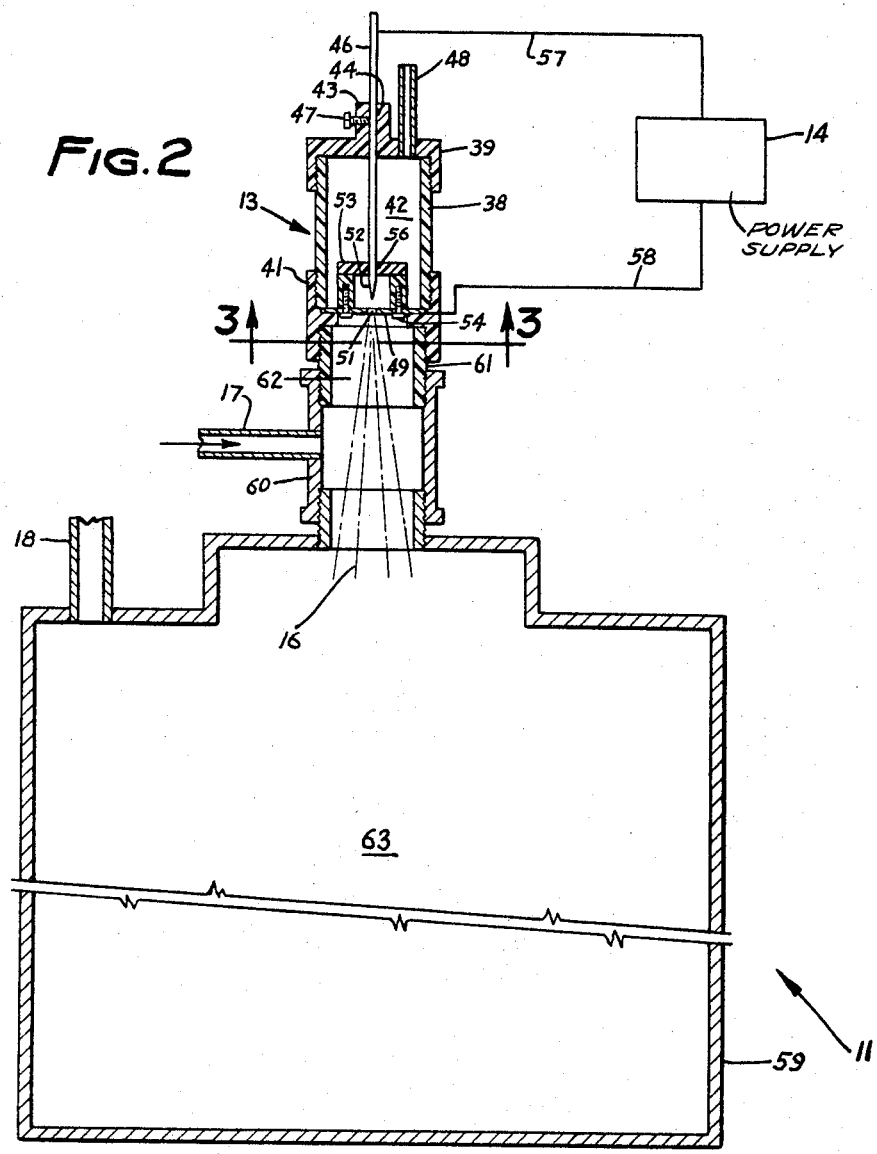
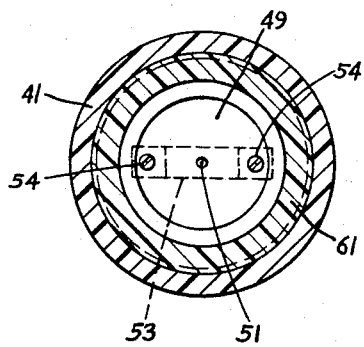
INVENTOR.
KENNETH T. WHITBY
BY Braddock+Burd
ATTORNEYS

United States Patent Office 3,413,545
Patented Nov. 26, 1968

3,413,545
APPARATUS AND METHOD FOR DETERMINING AEROSOL PARTICLE CONCENTRATION AND PARTICLE SIZE DISTRIBUTION
Kenneth T. Whitby, Minneapolis, Minn., assignor to Regents of the University of Minnesota, Minneapolis, Minn., a corporation of Minnesota
Filed June 23, 1965, Ser. No. 466,331
22 Claims. (Cl. 324—71)

ABSTRACT OF THE DISCLOSURE

An electric aerosol particle counting and size distribution measuring system for the 0.01 to 2 micron particle range. An aerosol charger unit having a gas ionizing device and diffusion chamber imparts a unipolar charge on aerosol particles in proportion to the size of the particles. The charged particles are delivered to a mobility analyzer having a housing with an elongated chamber. A particle collecting electrode projects axially into the chamber above a current collector and sensor filter connected to an electrometer. The separation of the collecting electrode and the current collector permits the use of collecting voltages up to 30 kv. while maintaining background currents below $10^{-14}$ amp.

---

This invention relates to a particle counter system for determining aerosol particle concentration and particle size distribution over the range from 0.01 to 2 microns. More particularly the invention is directed to an electrical apparatus and method for measuring an arbitrary aerosol particle size distribution, classifying aerosol particles according to size and monitoring the concentration of aerosol particles larger than a particular size.

The measurement of aerosol particle size distribution of relatively small solid or liquid particles suspended in air or gas, as smog, smoke, fog and mist, has achieved importance in the study of these particles and their effect on the human environment. At present nuclei and optical particle counter systems have been developed to measure particle size distribution. The nuclei counter is particularly useful in measuring relatively small particles as it is capable of sensing particles having a size as small as 0.0022 of a micron. The effective upper limit of particle size sensing of a nuclei counter is around 0.01 of a micron. The optical particle counter is used to measure relatively large particles and has a lower limit of sensitivity to particles of 0.3 of a micron in size.

These particle counter systems are capable of measuring portions of the particle size distribution of natural atmospheric aerosols but do not effectively operate to measure particle sizes over the entire range, 0.015 to 2 microns, of natural atmospheric aerosol particles. This particle size range is of interest as it includes atmospheric smog particles and particles involved in chemical photo reaction processes.

It is the object of this invention to provide a particle counter system operable to measure particle size distribution of natural atmospheric aerosols at ambient conditions of humidity and temperature to bridge the gap between the nuclei and optical particle counter systems.

Another object of the invention is to provide an electric particle counter system which produces particle size data that agrees with the same data produced by the nuclei and optical counter systems in the particle size ranges where the systems overlap so as to provide a basis for a system for continuously measuring the complete size distribution of an aerosol from molecular size up.

A further object of this invention is to provide an improved aerosol particle counter system wherein the aerosol particles are charged according to particle size and the electrical mobility of the charged aerosol particles is measured providing data which is a function of the aerosol particle size distribution.

Another object of the invention is to provide an improved method of measuring the size distribution of aerosols, such as natural atmospheric aerosols having relatively few particles above 1 micron.

A further object of the invention is to provide an aerosol charger unit having a sonic jet ion source operable to impart a stable and unipolar charge on aerosol particles.

Another object of the invention is to provide a unipolar diffusion particle charger unit operable to charge aerosol particles in relation to their sizes.

Still another object of the invention is to provide an improved method of impressing a unipolar electrical charge on aerosol particles.

A further object of the invention is to provide an improved charged particle mobility analyzer capable of producing data used to obtain either particle charge, particle size distribution, or particle number distribution.

Another object of the invention is to provide a charged particle mobility analyzer having a large mobility range and high resolution characteristics, resulting from the use of an electric precipitating field in combination with a current collector and sensor separated from the precipitating field.

Yet another object of the invention is to provide an improved method for determining the mobility of unipolar charged aerosol particles.

Other objects of the invention will become apparent as the description proceeds.

To the accomplishment of the foregoing and related ends, this invention comprises the features hereinafter fully described and particularly pointed out in the claims. The following description sets forth in detail a particular illustrative embodiment of the invention, this being indicative, however, of but one of the various ways in which the principles of the invention may be employed.

The invention is illustrated by the accompanying drawings in which the same numerals refer to corresponding parts and in which:

FIGURE 2 is an enlarged sectional view of the aerosol charger unit diagrammatically shown in the particle counter system of FIGURE 1;

FIGURE 3 is an enlarged sectional view taken along the line 3—3 of FIGURE 2 in the direction of the arrows;

Figure 1:
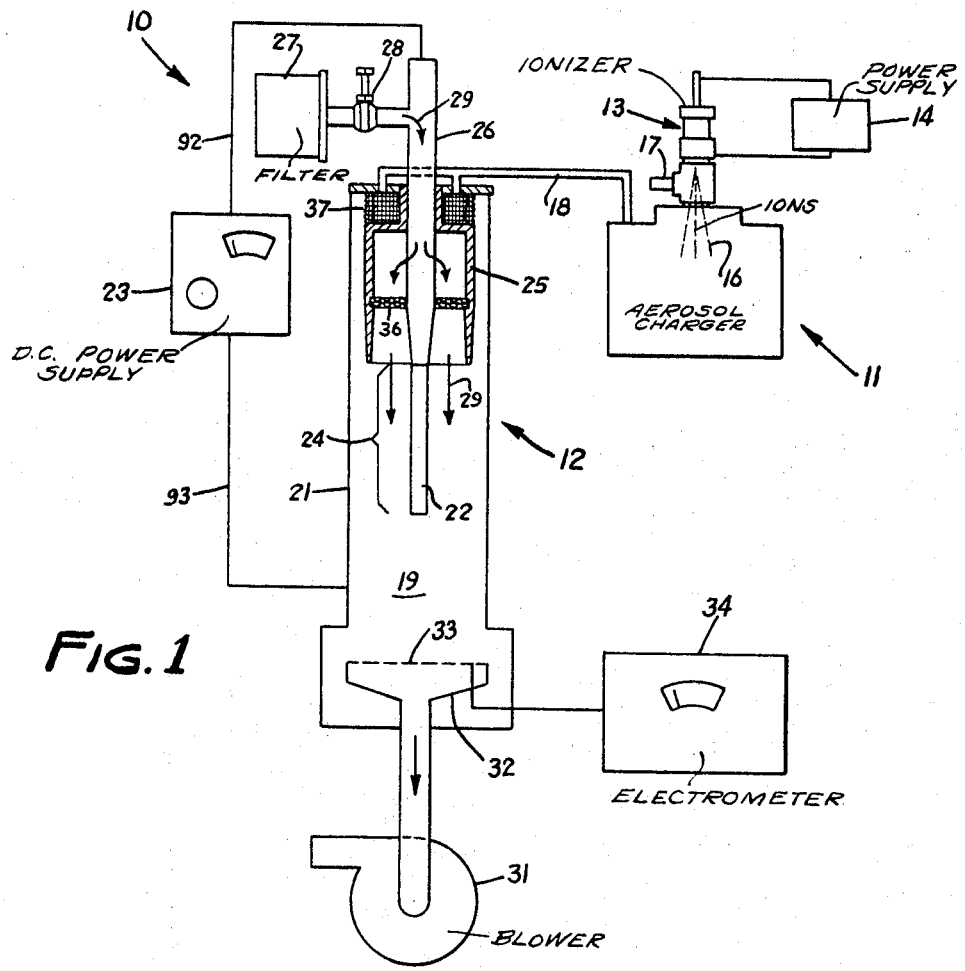
FIGURE 1 is a schematic view of the particle counter system of this invention.

Referring to the drawings there is shown in FIGURE 1 a schematic diagram of the electrical particle counter system of this invention indicated generally at 10. This particle counter system is an instrument for measuring the electrical mobility of charged aerosol particles to obtain data for determining the particle size distribution of the charged aerosol particles. This data is also usable to classify aerosol particles according to size. The basis for this measurement is in the energy equation wherein the mobility of the charged particles is proportional to the charge on the particles. When the charge on the particles is proportional to the size of the particles, the particle size distribution can be readily determined.

The particle counter system 10 embodies a process of measuring the electrical mobility of charged aerosol particles. This process includes the steps of providing a unipolar electrical charge on aerosol particles in relation to their size and then separating the charged particles according to their electric mobility. If the particle charge is properly related to the particle size, the particle size can be calculated from the mobility. A stable unipolar charge is imparted on the aerosol particles by an aerosol particle charger unit 11. From the charger unit 11 the stable and unipolar charged particles are directed to a particle mobility analyzer 12 which separates the particles according to the charge thereon and provides data used to determine particle size distribution.

The aerosol particle charger unit 11 has an ionizer 13 coupled to a power supply 14. The ionizer 13 discharges a stream of gas ions 16 which are mixed with aerosol particles to impart thereto an electrical charge. The aerosol particles are introduced through an inlet tube 17 and injected into the stream of gas ions 16. The charger unit 11 discharges a continuous supply of charged particles through an outlet tube 18 into the top of the particle mobility analyzer 12. The primary function of the charger unit 11 is to provide the aerosol particles with a stable and unipolar charge which is proportional to the size of the aerosol particles.

The particle mobility analyzer 12 comprises a cylindrical upright chamber 19 defined by an elongated housing 21. A metal electrode 22 is positioned axially of the chamber 19 and is coupled to a DC power supply 23 connected to the housing 21. The power supply 23 is operable to establish an annular electric field 24 about the electrode 22. The strength of the electrical field 24 is variable by changing the voltage applied to the electrode 22 thus changing the electrical potential between the housing 21 and the electrode 22.

The electrode 22 projects downwardly from guide member 25 positioned in the upper end of the chamber 19. A tubular member 26 axially projects through the guide member. A filter 27 is coupled to the tubular member 26 and provides an inlet for the flow of clean air into the chamber 19. This flow is regulated by a valve 28. The air flows in the direction of the arrows 29 and moves through the chamber 19 as an annular core about the electrode 22. A blower 31 draws the core of air through the chamber 19. The speed of blower 31 can be regulated to control the air pressure in chamber 19. A pair of screens 36 are positioned in the guide member 25 to insure laminar flow of the core of air through the chamber 19. The inlet of the blower 31 has a funnel 32 carrying a particle charge collector and sensor element 33 of a sensor 34.

The charged aerosol particles flow through the outlet tube 18 into the top of the chamber 19. Annular screens 37 eliminate turbulence in the flow of incoming charged aerosol so as to provide a smooth and axial flow of aerosol adjacent the inside wall of the housing 21. The laminar flow movement of the air core through the electric field 24 carries the charged particles downwardly toward the collector and sensor element 33.

As the charged particles move through the electrical field 24 they are attracted toward the electrode 22 according to the potential on the electrode 22. With a given potential on the electrode 22 charged aerosol particles of the opposite potential will develop a radial velocity toward the electrode 22 and will either be collected on the electrode 22 or pass through the electrical field 24 and collect on the collector and sensor element 33 located below the electrical field 24. The distance that the charged particle travels down the chamber 19 before striking the electrode 22 is a function of the charge carried by the particle and is thus related to the size of the particles. By varying the potential difference between the electrode 22 and the housing 21 particles having different electron units of charges may be selectively collected on the electrode 22. The particles which pass the electrode 22 are accumulated on the element 33 and actuate the sensor 34 to produce readable information correlated to the number of particles collected by the element 33.

The charge unit 11 is a diffusion aerosol particle charger. Referring to FIGURE 2, charger unit 11 has a sonic jet ion generator or ionizer 13 which comprises a cylindrical body 38 carrying caps 39 and 41 at the opposite ends thereof. The body 38 and caps 39 and 41 are formed from an electrically non-conductive plastic material and define a cylindrical chamber 42.

Cap 39 has an outwardly projected center boss 43 formed with an axial bore 44 for accommodating a thin wire or needle rod electrode 46. A set screw 47 is threaded into the boss 43 and engages the electrode 46 to fasten the electrode to the cap 39. A gas inlet tube 48 is secured to the cap 39 and provides a passage into the chamber 42. The tube 48 is connected to a source of gas under pressure, such as compressed air.

Cap 41 is in the form of a stepped annular ring and is used to secure a metal plate 49 against the lower end of the cylindrical body 38. The central section of the plate 49 has a small orifice 51 in axial alignment with the needle electrode tip 52. The tip 52 is held in precise alignment with the orifice 51 by a U-shaped bridge 53 secured to the top of the plate 49 with screws 54. The bridge 53 has an axial bore 56 accommodating the lower end of the electrode 46. The bore 56 is in exact alignment with the orifice 51 and thus functions as a guide for the needle electrode 46. A bridge 53 is relatively narrow as shown in FIGURE 3 so as not to interfere with the flow of gas through the chamber 42 from the inlet tube 48 to the orifice 51. The bridge is composed of electrically nonconductive material and holds the electrode tip 52 out of electrical contact with the plate 49.

The electrode tip 52 terminates in a sharp point spaced from the orifice 51. The spacing between this point and the orifice is adjustable and may vary from about ½ to 10 millimeters. The power supply 14 is a high voltage source which is connected by a line 57 to the upper end of the electrode 46 and by a line 58 to the plate 49.

The ionizer 13 is connected to the top of a tank 59 by coupling members 60 and 61 having an axial passage 62. An aerosol particle charging chamber 63 formed by the tank receives the gas ions 16 which are forced through the orifice 51 into the passage 62 in the coupling members 60 and 61. The inlet tube 17 for the aerosol projects from the side of the coupling member 60 and provides a passage for the flow of aerosol into the passage 62 for mixture with the stream of gas ions 16 therein.

In operation of the charger unit 11, a voltage of about 2500 to 10,000 volts is applied to the electrode 46. Preferably, a difference of about 3000 to 5000 volts is maintained between the electrode 46 and the plate 49. A gas is introduced into the ionizer chamber 42 through the inlet tube 48 at pressures between 15 to 200 pounds per square inch. This gas flows through the orifice 51 and functions to flush ions through the orifice 51 before they can collect on the orifice edge. The ions are liberated in the corona at the needle point and are accelerated toward the orifice edge where they are carried through the orifice by the sonic flow of gas and discharged as a stream of ions 16 into the charging chamber 63.

Unipolar charging of the aerosol particles is accomplished by exposing them to unipolar small ions in the charging chamber 63. This process is diffusion charging and is accomplished at a minimum ion concentration charging time product, $Nt$, to minimize space charge losses. Unipolar charging with aerosol particles with small ions is advantageous because a large section of the very small aerosol particles can be charged. The space charge losses depend exponentially on the ion generator output and the average time that the particles are in the charging chamber.

An important characteristic of the sonic jet diffusion charger unit 11 is the fact that the ion density in the region of the jet 16 where the charging takes place is quite independent of the ion output at the corona needle 52. This results from the space charge decay law for ions in a jet, $$n = \frac{n_o}{3.6 \times 10^{-6} n_o t + 1} \quad (1)$$

From Equation (1) it may be seen that if the product of the time since generation $t$, and the initial concentration in the jet orifice, $n_o$, is greater than about $10^6$, then $n$ becomes independent of $n_o$.

Therefore, this sonic jet diffusion charger unit 11 is uniquely stable.

As shown in the particle electrical mobility versus particle size graph on FIGURE 4, the aerosol particle charger unit 11 is operable to place a charge on the aerosol particles in relation to their size. Curve 71 is a monotomic function having a significant negative slope showing the relationship between particle size, $D_p$, and electrical mobility, Z. It is thus seen that aerosol particles between 0.01 and 2 microns are charged in accordance with particle size. The electrical mobility, Z, of particles of size $D_p$ having a charge of $q_p(D_p)$ is given by:

$$Z=\frac{Cq_p(D_p)}{3\pi\mu_g D_p}$$

where C is the Cunningham correction factor and $\mu_g$ is fluid viscosity. This equation shows that the electrical mobility is related to particle size and the charge on the particle. This relationship is illustrated in the curve shown in FIGURE 4.

In terms of a method of imparting a stable and unipolar charge on aerosol particles a charger unit 11 is operable to include the steps of generating a supply of unipolar ions in the ionizer chamber 42. This is accomplished by applying a negative high voltage to the electrode 46 which is spaced from the plate 49. When the gas under pressure is supplied to the ionizer chamber 42 the generated ions are continuously discharged through the orifice 51 and are carried as a stream of unipolar ions through the passage 62 and introduced into the charging chamber 63. As the ions from the ionizer 13 are forced into the charging chamber they are mixed with aerosol particles which enter through the inlet tube 17 and join with the ions in the passage 62. The mixing of the ions with the aerosol particles is continued in the charging chamber 63. The charged particles are continuously withdrawn from the charging chamber 63 through the outlet tube 18 and discharged into the mobility analyzer 12. The rate of flow of charged aerosol particles through the outlet 18 is substantially equal to the flow of aerosol particles through the inlet 17 and the air flow rate through the ionizer 13.

The mobility analyzer 12 is used to obtain data relating to the electrical mobility of the charged aerosol. Analyzer 12 has good resolution and discrete particle separation features which are achieved by introducing the charged aerosol into the precipitating field 24 in a thin annular ring around a core of clean air. The particle collector and sensor element 33 is positioned below the precipitating field 24. This permits wide variations in the strength of the precipitating field which is achieved by varying the voltage on the collector electrode 22.

As shown in FIGURE 5, the analyzer housing 21 is an upright cylindrical tube having a cylindrical inner wall defining the chamber 19. A top cover 72 is secured to the top of the housing. The lower end of the housing 21 has a flange 70 releasably mounted on a box structure 73 by clamps 103. The bottom wall of the box structure supports the blower funnel 32 in alignment with the bottom of the chamber 19. The guide member 25 has an inverted cup-shape and a stepped upright boss 74 projected through a central opening 76 in the cover 72. A nut 77 threaded on the outer end of the boss 74 rigidly secures the guide member 25 to the cover 72. This structure accurately maintains the annular spacing between the periphery of the cup-shaped member 25 and the inside wall of the housing 21. The boss 74 of the cup-shaped member 25 projects below the cover 72 and has a hole 78 for receiving the tubular member 26. The lower end of the tubular member 26 projects into the space defined by the cup-shaped member 25 and has a plurality of openings 79 which permit the flow of clean air into the chamber 19. A removable annular flange 81 is threaded onto the open end of the cup-shaped member 25 and engages the peripheral edge of the nylon screens 36 to secure the screens to the cup-shaped member.

The collector electrode 22 is positioned axially of the chamber 19 and below the cup-shaped member 25. Electrode 22 comprises a core rod 82 projected axially through the tubular member 26. The mid-portion of the rod 82 carries a tapered sleeve 83 of electrically non-conductive material having an upright threaded boss 84. The sleeve 83 engages the inner peripheral edge of the nylon screens 36 and is threaded into the bottom of the tubular member 26. The upper end of the rod 83 projects through a hole 86 in the tubular member 26. The rod 82 is rigidly secured to the tubular member 26 by nut 87 threaded on the upper end thereof.

A plurality of metal collector sleeves 88 carried on bushings 89 of non-conductive material are slidably disposed on the portion of the core rod 82 which projects downwardly from the sleeve 83. The sleeves 88 are stainless steel and vary in length. For purposes of microscopic and chemical analysis sleeves 88 are progressively larger when viewed from top to bottom. The sleeves 88 are retained in assembled relation with the core rod 82 by screw 91 threaded into the lower end of the rod 82. The screw 91 is in engagement with the metal of the lower collector sleeve 88 thereby electrically coupling the core rod 82 and the collector sleeves 88.

The power supply 23 is connected by a line 92 to the top of the rod 82 and by a line 93 to the housing 21. The percipitating field 24 is established by applying a voltage to the sleeves 83 which is varied up to 30 kv.

As shown in FIGURES 5 and 7, the funnel 32 faces the cupshaped member 25 and has a downwardly projected spout 94 mounted on the bottom wall of the box 73 by a pair of nuts 96 and 97. The upper portion of the funnel 32 has an enlarged annular rim 98 carrying the particle collector and sensor element 33 of the sensor 34. A glass fibered filter 99 is positioned over the element 33 and is held on the rim 98 by an annular ring 101. Releasable fastening devices 102, such as thumb screws, mount the ring 101 on the rim 98 and hold the filter 99 and sensor element 33 in assembled relation with the funnel 32.

As described, the housing 21 is mounted in sealing engagement with the top of the box 73 with the chamber 19 in alignment with the open end of the funnel 32. A seal 100 and clamps 103 are utilized to hold the housing 21 and box 73 in alignment and in sealing engagement. Clamps 103 are spaced about the box 73 and are operable to permit the separation of the housing 21 from the top of the box 73. When this is done the screw 91 and the collector sleeves 88 may be readily removed from the core rod 82. The filter 99 may be removed from the funnel 32 by releasing the fastening devices 102 and removing the annular ring 101.

The sensor 34 is a unit capable of measuring the electrical charge of the aerosol particles which pass through the precipitating field 24. The particular sensor used with the mobility analyzer 12 is a commercial instrument identified as a Vibrating Reed Electrometer, Carry Model 31 manufactured by the Applied Physics Corporation, Monrovia, Calif. The sensor 34 includes a head 104 coupled to the sensor element 33 by a line 106. The head 104 is mounted on the bottom wall of the box 73 and is electrically coupled to the main body 107 of the sensor. A sensor operable to measure particle size and particle size concentration may be used to measure the aerosol particles which pass through the electrical field 24.

In the operation of the analyzer 12 the charged aerosol in the tube 18 enters the top of the chamber 19 through plugs 108 and 109 mounted in the cover 72. The charged aerosol flows into the chamber 19 under the suction influence of the blower 31 which withdraws air through the funnel 32. As the aerosol particles flow into the chamber 19 they flow through the annular screens 37 which eliminates turbulence in the aerosol flow. From the screens 37 the aerosol flows outwardly to the wall of the housing 21 and then downwardly as a thin annular cylinder in the annular space between the housing wall and periphery of the cup-shaped member 25. The blower 31 also functions to draw clean air through the filter 27. From the filter 27 the air flows through the tubular member 26 and the openings 79 into the chamber 19. The air then flows through the nylon screens 36 and moves downwardly therefrom in laminar flow as an annular core of air passing through the precipitating field 24. This core of air axially carries the charged aerosol particles in a downward direction toward the sensing element 33.

With a known voltage applied to the collector sleeves 88 a difference in potential exists between the sleeves 88 and the housing 21 thus establishing the electrical field 24. Under these conditions a charged particle of the opposite potential will develop a radial velocity and strike the sleeves 88 or miss the sleeves 88 and be collected on the filter 99. A charged particle collected on the filter is indicated as a current by the sensor or electrometer 34. The distance that the charged particle travels down the housing 21 before striking the electrode 22 is a function of the charge carried by the particle. Particle number distribution is determined by obtaining current measurements on the electrometer over a range of voltages applied to the electrode 22. These operating characteristics are further defined in an example hereinafter.

In terms of a method for determining particle size distribution of an aerosol, the aerosol particles are initially charged with a stable unipolar electrical charge proportional to particle size. These charged particles are directed to the mobility analyzer 12. As the charged unipolar aerosol particles flow into the analyzer they are guided into a thing cylindrical laminar flow concentric with an elongated electrode 22. The charged particles are moved linearly downwardly through the mobility analyzer by a core of linearly moving clean air 29. As the particles move downwardly an electric potential of varying voltages is applied to the electrode 22 to establish a precipitating electric field 24 attracting charged particles to the electrode 22. The aerosol particles will be collected on the electrode in accordance with their charge. The particles which pass through the field are collected on the particle sensor element 33. A sensor 34 records the charge impressed on the sensor element 33. This information is correlated with the change in the electrical field to provide data for determining particle size distribution.

The following is an example of an operating run of the particle counter system 10. The operating conditions of the electrical particle counter system for which the data and Table A was obtained are:

Total air flow rate=4.5 c.f.m.
Clean air flow rate=3.58 c.f.m.
Ionizer+aerosol flow rate=0.92 c.f.m.
  I. Ionizer flow rate=0.15 c.f.m.
  II. Aerosol flow rate=0.77 c.f.m.
Voltage on center rod of analyzer=0 to +30 kv.
Voltage on ionizer of charger=3.8 kv.
Air pressure to ionizer of charger=35 p.s.i.g.

Table A tabulated hereinafter was constructed with the use of the working equation for the mobility analyzer 12 and the experimental data of the example.

Figure 4:
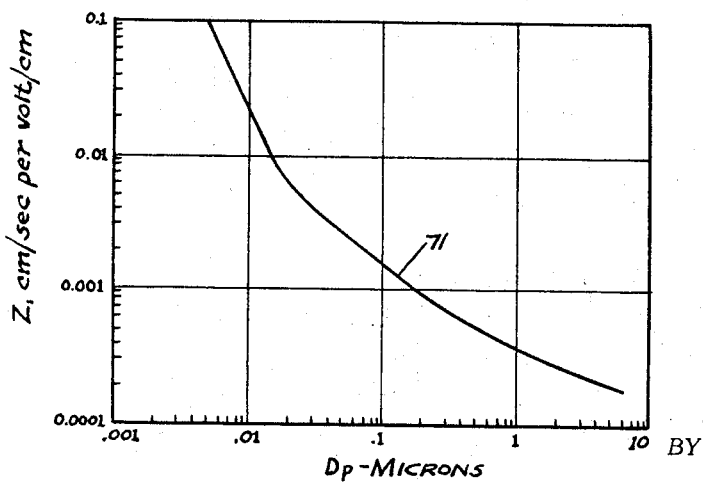
FIGURE 4 is a graph showing the electrical mobility (Z) versus particle size ($D_p$) curve of aerosol particles discharged by the aerosol charger unit of FIGURE 2.
Figure 5:
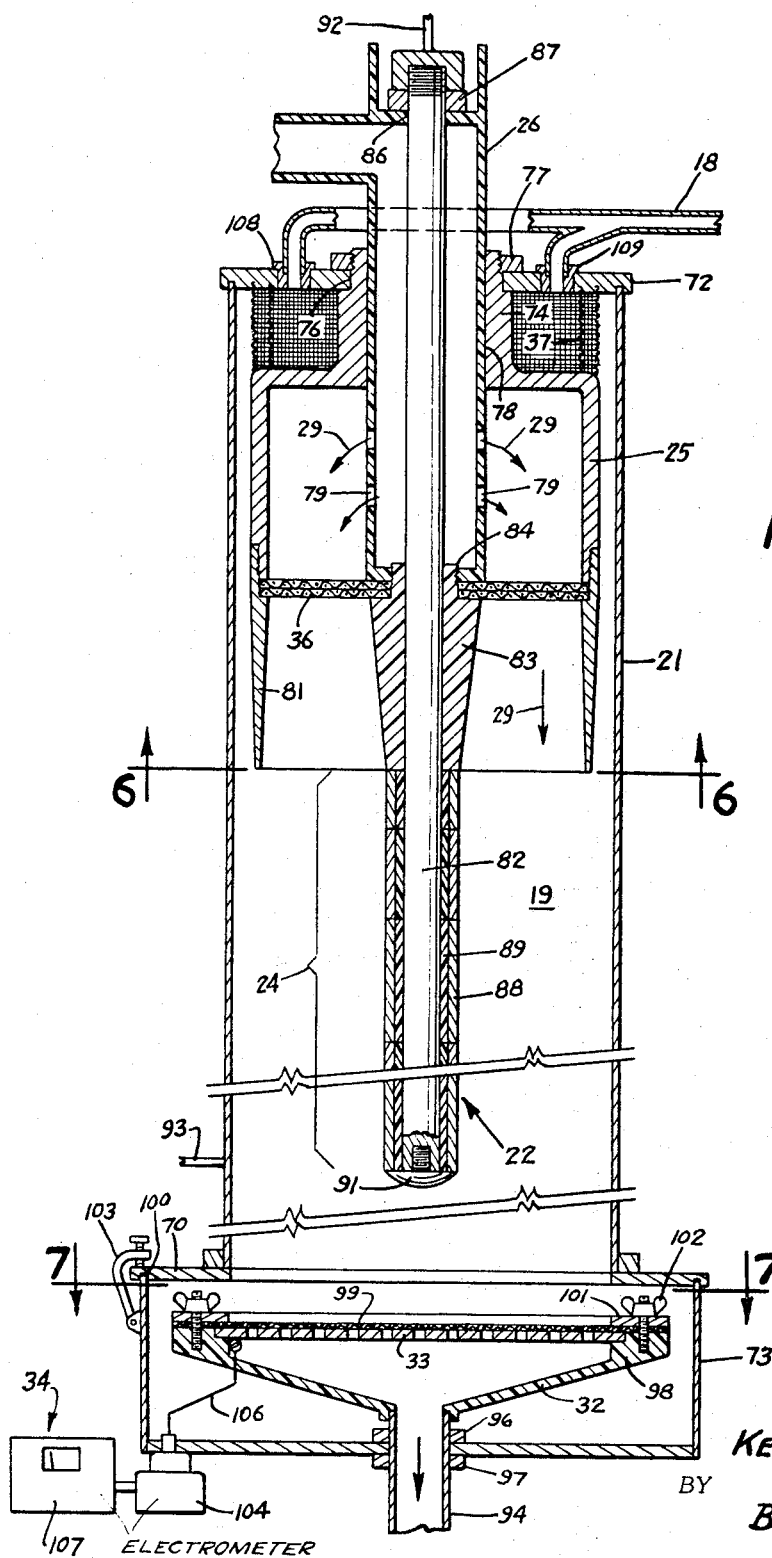
FIGURE 5 is an enlarged sectional view of the mobility analyzer diagrammatically shown in FIGURE 1.
Figure 6:
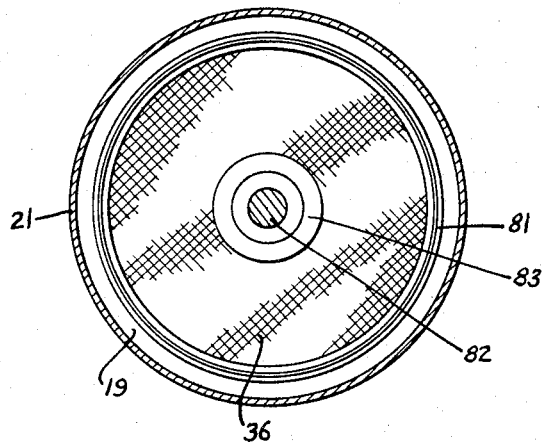
FIGURE 6 is a sectional view taken along the line 6—6 of FIGURE 5 in the direction of the arrows.
Figure 7:
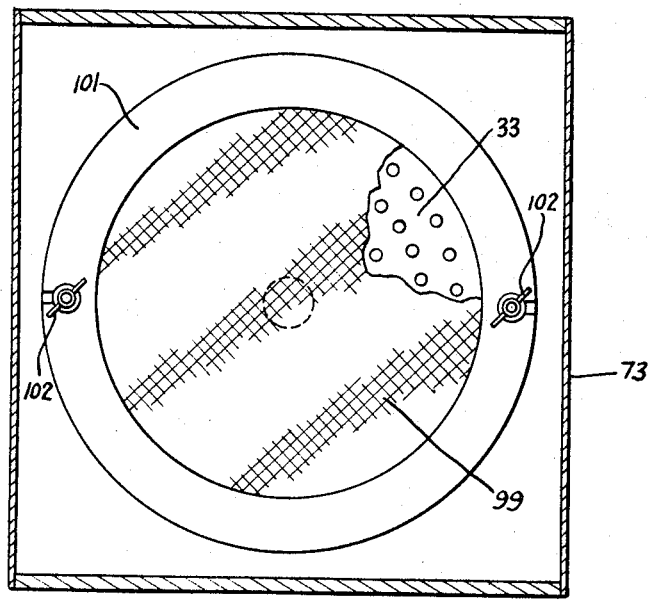
FIGURE 7 is a sectional view taken along the line 7—7 of FIGURE 5.

The working equation of the mobility analyzer is expressed as:

$$N_p = 3.27 \times 10^8 \frac{q^t}{V_x} \frac{D_p}{C}$$

wherein, $N_p$=number of elementary charges caused by a particle
$q^t$=total flow rate through analyzer, cm.$^3$/sec.
$V_x$=axial velocity, cm./sec.
$D_p$=particle diameter, cm.
$C$=Cunningham slip correction In Table A, Column 1 is the particle size between adjacent increments which were selected over the interval for which the number distribution applies. Column 2 is the mid-point of each increment. The $N_p$ in Column 3 is obtained from a plot of $N_p$ versus $D_p$. Column 4 obtained from the Z versus $D_p$ plot of curve 71 of FIGURE 4.

For each mobility value given in Column 4 there is a corresponding voltage which will precipitate on to the electrode 22 all the particles possessing electrical mobilities equal to or greater than the given mobility. This corresponding voltage is tabulated in Column 5 and is obtained from the equation $V=7.476Z_p^{-1}$. Column 6 is obtained from the plot of I versus V. Column 7 is a decrease in current in each particular particle size increment.

Column 8 represents the number of particles in a particular particle range and which number is calculated from the following equation:

$$N_o = \frac{0.625 \times 10^{19} I}{Q_a}$$

TABLE A.—CALCULATION OF THE NUMBER FREQUENCY PARTICLE SIZE DISTRIBUTION AS DETERMINED BY THE ELECTRICAL PARTICLE COUNTER SYSTEM 10

| (1) | (2) | (3) | (4) | (5) | (6) | (7) | (8) | (9) |
|---|---|---|---|---|---|---|---|---|
| $D_p$, Micron | $D_p{}^i$, Micron | $N_p$, Charges | $Z_p$, cm./sec., volt/cm. | V, Volts | I, μμ amps | ΔI, μμ amps | Δ$N_0$, No/cm.$^3$ | Δ$N_0$/Δ$D_p$, No/cm.$^3$, Micron |
| .01 | | | .0225 | 332 | 7.9 | | | |
| | .0139 | 1 | | | | 2.4 | 41,280 | 5.29×10$^6$ |
| .0178 | | | .0075 | 1,038 | 5.5 | | | |
| | .0249 | 1.43 | | | | 1.45 | 17,372 | 1.22×10$^6$ |
| .032 | | | .0040 | 1,870 | 4.05 | | | |
| | .044 | 2.79 | | | | 1.35 | 8,325 | 3.47×10$^5$ |
| .056 | | | .00258 | 2,900 | 2.7 | | | |
| | .078 | 4.91 | | | | 1.34 | 4,696 | 1.07×10$^5$ |
| .10 | | | .00162 | 4,615 | 1.36 | | | |
| | .139 | 8.2 | | | | 0.95 | 1,995 | 2.56×10$^4$ |
| .178 | | | .000101 | 7,400 | .41 | | | |
| | .249 | 12.4 | | | | 0.353 | 4.90 | 3.45×10$^3$ |
| .32 | | | .000662 | 11,300 | .057 | | | |
| | .44 | 21.0 | | | | 0.042 | 34.4 | 143.3 |
| .56 | | | .00050 | 15,000 | .015 | | | |
| | .79 | 33.0 | | | | 0.005 | 2.58 | 5.8 |
| 1.0 | | | .00037 | 20,200 | .01 | | | | where $N_o$ = number/cm.³
$I$ = current, amperes
$Q_a$ = aerosol flow rate, cm.³/sec.

The number of particles per micron tabulated in Column 9 is the value obtained by dividing Column 8 by the respective particle size increment. A plot of $\Delta N/\Delta D_p$ versus $D_p$, yields the desired number frequency particle size distribution.

The maximum particle sizing and classifying range of an instrument such as particle counter system 10 is limited by the particle size at which particle mobility reaches a minimum and then begins to increase again. The particle size at which minimum mobility is obtained may be increased by decreasing the pressure at which the particles are precipitated. Reducing the pressure increases the Cunningham slip correction, thereby shifting the mobility minimum to a larger size. This constitutes another means by which the upper sizing limit of this instrument may be raised. It has been found that the mobility minimum can be increased to over 5 microns at a pressure of 0.1 atmosphere.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. A system for determining aerosol particle concentration and particle size distribution comprising (a) apparatus for imparting a unipolar charge on aerosol particles including
  (1) a gas ionizing device operable to generate and discharge a stream of gas ions,
  (2) a container having a chamber for receiving the stream of gas ions,
  (3) means for introducing aerosol particles into said stream of gas ions, and
  (4) passage means for carrying charged aerosol particles from the chamber, (b) analyzer means for measuring the electrical mobility of the charged aerosol particles, said analyzer means including
  (1) a housing having an elongated chamber connected at one end thereof to said passage means for receiving charged aerosol particles
  (2) elongated electrode means projected axially into said elongated chamber,
  (3) a variable high voltage D.C. power source coupled to said housing and electrode means operable to establish electrical fields of varying strength in said elongated chamber,
  (4) cup-shaped means mounted on said housing and projected into said elongated chamber from said one end for guiding the charged particles in laminar flow concentrically about and spaced from the electrode means,
  (5) inlet means for carrying clean air into said elongated chamber and guiding said air as a core of air between the electrode means and the charged particles,
  (6) means coupled to the housing for withdrawing air and aerosol particles through the electrical field,
  (7) sensor means for determining the number and size of the particles which pass through the electrical field whereby a change in the electrical field strength and the sensed particles produce data relating to particle size distribution and particle size concentration.

2. The system of claim 1 wherein said sensor means comprises (a) plate means for collecting the charged particles which pass through the electrical field and (b) means coupled to the plate means for sensing the charge strength of the particles engaging the plate means and producing readable data which is a function of the charge strength.

3. An instrument for determining the electrical mobility of aerosol particles comprising (a) an aerosol charger unit operable to impart a unipolar electrical charge on aerosol particles which varies according to the size of the particles, (b) analyzer means for measuring the electrical mobility of the charged aerosol particles, (c) means for carrying a supply of charged aerosol particles from the charger unit to the analyzer means, (d) said analyzer means including
  (1) a housing having an upright cylindrical chamber,
  (2) electrode means projected axially into said chamber,
  (3) a high voltage D.C. power supply coupled to said housing and electrode means operable to establish an electrical field in said chamber,
  (4) means in said chamber for guiding the charged aerosol particles in laminar flow concentrically about and spaced from the electrode means,
  (5) means for moving the charged aerosol particles into the electrical field whereby large particles having a large charge are collected on the electrode and small particles pass through the electric field in relation to the strength of the electrical field,
  (6) sensor means for collecting the charged particles which pass through the electric field and indicating the charge strength of the collected particles whereby a change in the electric field strength and the sensed charged particles produces data relating to particle size distribution and particle size concentration.

4. An instrument for determining the electrical mobility of aerosol particles comprising (a) an aerosol charger unit operable to impart a unipolar electrical charge on aerosol particles which varies according to the size of the particles, (b) analyzer means for measuring the electrical mobility of the charged aerosol particles, (c) means for carrying a supply of charged aerosol particles from the charger unit to the analyzer means, (d) said analyzer means including
  (1) a housing having an upright cylindrical chamber,
  (2) electrode means projected axially into said chamber,
  (3) a high voltage D.C. power supply coupled to said housing and electrode means operable to establish an electrical field in said chamber,
  (4) means in said chamber for guiding the charged aerosol particles in laminar flow concentrically about and spaced from the electrode means,
  (5) means for removing air from said chamber and establishing a core of moving air about said electrode means for moving the charged aerosol particles through the electrical field whereby large particles having a large charge are collected on the electrode and smaller particles pass through the electrical field in relation to the strength of the electrical field, and
  (6) sensor means for determining the number and size of the particles which pass through the electrical field to produce data relating to particle size distribution and particle size concentration.

5. The system of claim 4 wherein said sensor means comprises (a) plate means for collecting the charged particles which pass through the electrical field and
(b) means coupled to the plate means for sensing the charge strength of the particles engaging the plate means and producing readable data which is a function of the charge strength.

6. A method of determining the size distribution of aerosol particles comprising the steps of
   (a) charging the aerosol particles with a unipolar electric charge proportional to particle size,
   (b) directing the charged aerosol particles about a core of moving clean air,
   (c) moving the core of clean air and charged aerosol particles linearly through an electrical field of opposite electric charge from the charge on the particles,
   (d) collecting charged particles of a certain size or larger in the center of the field,
   (e) varying the electrical field to change particle size limits of the particles collected in the field, and
   (f) collecting the charged particles smaller than the certain sized particles below the electrical field,
   (g) sensing the electrical charge on the particles collected below the electrical field, and
   (h) correlating the change in the electric field with the change in the electrical charge sensed below the electrical field to provide data for determining particle size distribution.

7. A method of determining the size distribution of aerosol particles comprising the steps of
   (a) charging the aerosol particles with a unipolar electric charge proportional to particle size,
   (b) moving the charged particles linearly through an electrical field of opposite electric charge from the charge on the particles adjacent a stream of moving clean air thereby collecting particles of a given size or larger in the field,
   (c) varying the electrical field to change the particle size limits of the charged particles collected in the field,
   (d) determining the number and size of the charged particles which pass through the electrical field, and
   (e) correlating the change in the electric field with the change in the number and size of the charged particles which pass through the electrical field to provide data for determining particle size distribution.

8. A method of determining the size distribution of aerosol particles comprising the steps of
   (a) charging the aerosol particles with a unipolar electric charge proportional to particle size,
   (b) moving the charged particles linearly through an electrical field of opposite electric charge from the charge on the particles about a core of moving clean air thereby collecting particles of a given size or larger in the field,
   (c) varying the electrical field to change the particle size limits of the charged particles collected in the field,
   (d) collecting the particles which pass through the electric field,
   (e) sensing the electrical charge on the collected charged particles, and
   (f) correlating the change in the electrical field with the change in the electrical charge sensed to provide data for determining particle size distribution.

9. The method defined in claim 8 including the step of
   (a) reducing the pressure in the area of the electric field during the movement of the particles in the field.

10. A method of determining the size distribution of aerosol particles comprising the steps of
   (a) charging the aerosol particles with a unipolar electric charge proportional to particle size,
   (b) moving the charged particles linearly through an electrical field of opposite electric charge from the charge on the particles adjacent a stream of moving clean air thereby collecting particles of a given size or larger in the field,
   (c) collecting the particles which pass through the electric field,
   (d) sensing the electrical charge on the collected particles, and
   (e) correlating the electrical field with the electrical charge sensed to provide data for determining particle size distribution.

11. A method of determining the size distribution of aerosol particles comprising the steps of
   (a) charging the aerosol particles with a unipolar electric charge proportional to particle size,
   (b) directing the charged aerosol particles about a core of moving clean air,
   (c) moving the core of clean air and charged aerosol particles linearly through an electrical field of opposite polarity from the charge on the particles,
   (d) collecting particles of a certain size or larger in the center of the field,
   (e) varying the electrical field to change particle size limits of the particles collected in the field,
   (f) determining the number and size of the particles which pass through the electrical field, and
   (g) correlating the change in the electric field with the change in the number and size of the particles which pass through the electrical field to provide data for determining particle size distribution.

12. In an instrument for determining the electrical mobility of unipolar charged aerosol particles,
   (a) a housing having a cylindrical chamber defined by a cylindrical inner wall, an upper end and a lower end,
   (b) metal rod means located axially of said chamber,
   (c) means for mounting the rod means on the upper end of the housing with the rod means projected axially into the chamber and electrically insulated from the cylindrical inner wall,
   (d) a D.C. power supply coupled to the rod means and the housing for establishing an electrical field in said chamber,
   (e) inverted cup-shaped means mounted on the upper end of the housing, said cup-shaped means having an annular flange projected into the chamber and spaced from the cylindrical inner wall,
   (f) first inlet means for carrying charged aerosol particles to the annular space between the cup-shaped means and the cylindrical inner wall,
   (g) second inlet means for carrying filtered air to the inside area of the cup-shaped means,
   (h) blower means connected to the lower end of the housing for withdrawing air and aerosol from said chamber, said air having laminar flow in said chamber and carrying the charged particles axially of the chamber adjacent the cylindrical inner wall and through said electrical field,
   (i) sensor means for collecting the charged particles which pass through the electrical field and indicating the charge strength of the collected particles.

13. In an instrument for determining the electrical mobility of aerosol particles having a unipolar charge related to the size of the particle,
   (a) a housing having an elongated chamber defined by an inner wall, an upper end, and a lower end,
   (b) an elongated electrode means projected axially into said chamber,
   (c) means for mounting the electrode means on the upper end of the housing with the electrode means projected axially into the chamber,
   (d) a high voltage variable D.C. power source coupled to said housing and electrode means operable to establish electrical fields of varying strength in said chamber,
   (e) means in said chamber adjacent said upper end for guiding charged aerosol particles in laminar flow concentrically about and spaced from the electrode means, (f) inlet means for carrying charged aerosol particles to the upper portion of said chamber, and (g) means connected to the lower end of the housing for withdrawing air and aerosol from said chamber, said air in said chamber having laminar flow and carrying the charged particles axially of the chamber adjacent the inner wall thereof and through said electrical fields.

14. In an instrument for determining the electrical mobility of aerosol particles carrying a unipolar charge related to the size of the particles, (a) a housing having an upright cylindrical chamber, (d) electrode means projected axially into said chamber, (c) a high voltage variable D.C. power supply coupled to said housing and said electrode means, said power supply operable to establish variable electric fields in said chamber, (d) means in said chamber for guiding charged aerosol particles in laminar flow concentrically about and spaced from the electrode means, (e) means for removing air from said chamber and establishing a core of moving air about said electrode means for moving the charged aerosol particles through the electrical fields whereby particles having a large charge are collected on the electrode means and particles having a small charge pass through the electrical fields in relation to the strength of said electrical fields.

15. The instrument structure defined in claim 14 including (a) sensor means for determining the number and size of the particles which pass through the electrical fields to produce data relating to particle size distribution and particle size concentration.

16. An apparatus for imparting a stable and unipolar charge on aerosol particles comprising (a) a gas ionizing device including a housing having a chamber, a gas inlet to said chamber connectable to a source of gas under pressure, an electrically conductive plate extended across one end of the chamber, said plate formed with an orifice providing an ionized gas discharge port from said chamber, a needle electrode mounted on said housing and projected into said chamber, said needle having a tip positioned in axial alignment with the orifice and spaced therefrom, a high voltage D.C. power source coupled to said plate and needle electrode operable to establish a differential voltage between said plate and needle electrode to produce a gas-ionizing discharge between the tip of the needle electrode and the orifice, said ion discharge being forced through said orifice by the gas under pressure in the chamber whereby a stream of gas ions is discharged by the ionizing device, (b) a container having a chamber and outlet passage means for carrying charged aerosol particles from the chamber, and (c) coupling means connecting the ionizing device to the container whereby the ionizing device discharges the stream of gas ions into the chamber, said coupling means having an inlet passage for directing aerosol particles into the stream of gas ions.

17. An apparatus for imparting an electrical charge on aerosol particles comprising (a) an ionizing device including a housing having a chamber, an inlet to said chamber connectable to a source of gas under pressure, electrical conductor means closing one end of said chamber, said conductor means having at least one orifice providing an ionized gas discharge port from said chamber, needle electrode means projected into said chamber, said electrode means having tip means positioned in axial alignment with said orifice and spaced therefrom, a high voltage power source coupled to said electrode means and conductor means operable to establish a differential voltage between said electrode means and conductor means thereby producing a gas-ionizing discharge between the tip means and orifice aligned therewith, said ion discharge being forced through said orifice by the gas under pressure in the chamber whereby a continuous stream of gas ions is discharged by the ionizing device, (b) a container having a diffusion chamber, inlet means connected to the ionizing device for directing the stream of ions into the chamber, and outlet passage means for carrying charged aerosol particles from the diffusion chamber, said ionizing device associated with said inlet means to discharge said stream of gas ions into said diffusion chamber, and (c) means for directing aerosol particles into the stream of gas ions.

18. An apparatus for imparting an electrical charge on aerosol particles comprising (a) an ionizing device including a housing having a chamber, an inlet to said chamber connectable to a source of gas under pressure, electrical conductor means closing one end of said chamber, said conductor means having at least one orifice providing an ionized gas discharge port from said chamber, needle electrode means projected into said chamber, said electrode means having tip means positioned in axial alignment with said orifice and spaced therefrom, a high voltage power source coupled to said electrode means and conductor means operable to establish a differential voltage between said electrode means and conductor means thereby producing a gas-ionizing discharge between the tip means and orifice aligned therewith, said ion discharge being forced through said orifice by the gas under pressure in the chamber whereby a continuous stream of gas ions is discharged by the ionizing device, (b) a container having a diffusion chamber, inlet means connected to the ionizing device for directing the stream of ions into the diffusion chamber, and outlet passage means for carrying charged aerosol particles from the diffusion chamber, said ionizing device associated with said inlet means to discharge said stream of gas ions into said diffusion chamber, and (c) means for directing aerosol particles into the stream of gas ions.

19. An apparatus for imparting an electrical charge on aerosol particles comprising (a) an ionizing device including a housing having a chamber, an inlet to said chamber connectable to a source of gas under pressure, electrical conductor means closing one end of said chamber, said conductor means having at least one orifice providing an ionized gas discharge port from said chamber, needle electrode means projected into said chamber, said electrode means having tip means positioned in axial alignment with said orifice and spaced therefrom, a high voltage power source coupled to said electrode means and conductor means operable to establish a differential voltage between said electrode means and conductor means thereby producing a gas-ionizing discharge between the tip means and orifice aligned therewith, said ion discharge being forced through said orifice by the gas under pressure in the chamber whereby a continuous stream of gas ions is discharged by the ionizing device, (b) a container having a chamber and outlet passage means for carrying charged aerosol particles from the chamber, (c) coupling means connecting the ionizing device to the container whereby the ionizing device discharges the stream of gas ions into the chamber, and (d) means connected to the coupling means for directing aerosol particles into the stream of gas ions, and into the coupling means at a substantially even rate thereby uniformly mixing with the stream of gas ions discharged by the ionizing device.

20. An apparatus for imparting a stable electrical charge on aerosol particles comprising
  (a) container means defining a chamber,
  (b) ion generator means for producing a stream of gas ions,
  (c) coupling means connecting the generator means to the container means, said coupling means having a passage to direct the stream of gas ions into said chamber,
  (d) first means attached to said coupling means for directing aerosol particles into the passage for mixture with the stream of gas ions, and
  (e) outlet means on said container means for carrying the charged aerosol from the chamber.

21. A method of imparting a stable electrical unipolar charge on aerosol particles including the steps of
  (a) generating a supply of unipolar gas ions,
  (b) introducing the unipolar gas ions into a chamber,
  (c) mixing aerosol particles with said gas ions prior to the introduction thereof into the chamber, and
  (d) withdrawing charged aerosol particles from said chamber.

22. A method of imparting an electrical unipolar charge on aerosol particles according to particle size including the steps of
  (a) continuously generating a stream of unipolar gas ions,
  (b) continuously discharging the stream of unipolar gas ions into a chamber,
  (c) continuously introducing aerosol particles into said stream of gas ions prior to the discharge thereof into said chamber, and
  (d) continuously withdrawing charged aerosol particles from said chamber.

References Cited

UNITED STATES PATENTS

| | | | |
|---|---|---|---|
| 2,264,495 | 12/1941 | Wilner. | |
| 3,114,877 | 12/1963 | Dunham | 324—71 |
| 3,258,634 | 6/1966 | Rich | 324—33 |
| 3,317,790 | 5/1967 | Whitby | 317—4 |

FOREIGN PATENTS 1,372,208  8/1964  France.

RUDOLPH V. ROLINEC, *Primary Examiner.*

C. F. ROBERTS, *Assistant Examiner.*